United States Patent [19]

Briere

[11] 4,400,190

[45] Aug. 23, 1983

[54] GRAPHITE ELEMENT FOR USE IN A FURNACE FOR DRAWING OPTICAL FIBER

[75] Inventor: Alfred D. Briere, Worcester, Mass.

[73] Assignee: GTE Laboratories Incorporated, Waltham, Mass.

[21] Appl. No.: 306,066

[22] Filed: Sep. 28, 1981

[51] Int. Cl.[3] .................. C03B 37/07; C03B 37/09

[52] U.S. Cl. .................. 65/13; 65/2; 65/12; 373/134

[58] Field of Search .................. 65/2, 12, 13, 29; 373/27, 123, 134; 219/412

[56] References Cited

U.S. PATENT DOCUMENTS 4,030,901 6/1977 Kaiser .................. 65/2

4,174,842 11/1979 Partus .................. 65/2 X

FOREIGN PATENT DOCUMENTS 560841 6/1977 U.S.S.R. .................. 65/13

*Primary Examiner*—Robert L. Lindsay, Jr.
*Attorney, Agent, or Firm*—Fred Fisher

[57] ABSTRACT

A furnace for drawing optical fiber includes a graphite element of generally cylindrical shape with a reduced central cross-sectional configuration having a flange at opposite ends thereof and having an axial hole therethrough including a central internal element chamber for receiving a glass preform, means for heating the reduced central cross-sectional configuration, and, hence, the central internal element chamber, so that an optical fiber can be drawn from the preform. The invention relates to providing a relationship between the internal diameter of the central internal element chamber and the inner diameter of the exhaust tubes so as to minimize gas turbulence within the central internal element chamber and thereby control the diameter of an optical fiber being drawn. The relationships can be such that the internal diameter of the central internal element chamber and the inner diameters of an input exhaust tube and an exit exhaust tube are substantially equal. The transitions from an enlarged hole to the central internal element chamber can be by way of tapers.

9 Claims, 3 Drawing Figures

GRAPHITE ELEMENT FOR USE IN A FURNACE FOR DRAWING OPTICAL FIBER

BACKGROUND OF THE INVENTION

1. Field of the Invention

This invention relates to a furnace for drawing optical fiber and, in particular, to an improved graphite element for use therein. Accordingly, it is a general object of this invention to provide new and improved apparatus of such character.

2. Description of the Prior Art

A graphite heating element has been used for heating an optical fiber preform to its softening temperature so that the preform can be drawn to an optical fiber. A graphite heating element should provide conditions suitable for good fiber diameter control. Optical fibers can be drawn to long lengths from preforms; such lengths can be in the order of one kilometer to ten kilometers, and even longer. The fiber diameter should be maintained to a tolerance of ±1% to minimize splice losses. The graphite heating element should be maintained at a constant temperature during operation, since temperature variations can cause changes in fiber diameter. To prevent oxidation of the graphite heating element at its operating temperature (which may be in the neighborhood of 2000° C.) tubular input and exit exhaust tubes are inserted into the respective ends of the element to provide for an inert atmosphere (such as argon) therewithin. The glass preform is inserted into the input exhaust tube and positioned within the element chamber where it is heated, and drawn out of the exit exhaust tube to produce an optical fiber. The exhaust tubes are used to direct proper inert gaseous flow to the hot zone within the element.

A disadvantage of a prior art graphite heating element is that the through hole of the element is significantly larger than the glass preform. Such difference in size adversely affects the fiber diameter control, due to gas turbulence (it is believed) that occurs in the annular space between the preform and the element. It is theorized that the turbulence is due to convective gas motion caused by high temperatures, producing a "chimney effect". Due to the "chimney effect", fiber diameter fluctuations tend to enlarge. The mismatch between the element and the preform measurements causes other adverse effects: Additional electrical energy is required to heat the dead space (and, hence, the preform) between the internal wall of the element and the preform. Additional electrical energy increases operating cost. It is believed that such additional electrical energy applied to the graphite heating element, may severely reduce element life.

SUMMARY OF THE INVENTION

Another object of this invention is to provide for a new and improved furnace for drawing optical fiber in which the fiber can be produced with little change in diameter.

Still another object of this invention is to provide for a new and improved graphite heating element which has longer life than corresponding heating elements of the prior art.

Still yet another object of this invention is to provide for a new and improved furnace for drawing optical fiber, which furnace utilizes less power consumption than other furnace of the prior art.

In accordance with a preferred embodiment of the invention, a furnace for drawing optical fiber includes a graphite heating element. The element is generally cylindrical in shape, with a reduced central cross-sectional configuration. The element has a flange at opposite ends, and has an axial hole therethrough including a central internal element chamber for receiving a glass preform. Heat is provided for the reduced central cross-sectional configuration and, hence, the central internal element chamber, so that an optical fiber can be drawn from the preform. The graphite heating element is supported at the flanges. An input exhaust tube has a principal central portion adapted to reside within the axial hole at the top of the graphite heating element. The tube has an inner diameter large enough to permit the glass preform to fit therewithin and to permit an inert gas to pass exterior to the preform, and interior to the tube. The input exhaust tube has a flange, and is supported by suitable means. An exit exhaust tube has a principle central portion adapted to reside within the axial hole at the bottom of the graphite heating element, the exit exhaust tube having an inner diameter large enough to permit an optical fiber to pass therethrough and to permit an inert gas to pass exterior to the optical fiber and interior to the exit exhaust tube. The exit exhaust tube has a flange and is supported by suitable means. Inert gas, applied to the top of the heating element, passes down through the interior of the input exhaust tube, and up and out around the outside of the input tube within the axial hole. Further, inert gas, applied to the bottom of the heating element, passes up through the interior of the exit exhaust tube, and is permitted to pass down and out around the outside of the exit exhaust tube within the axial hole. The improvement in the foregoing combination resides in an internal diameter of the central internal element chamber and the inner diameter of the input exhaust tube having a relationship so as to minimize gas turbulence within the central internal element chamber. In accordance with certain features of the invention, the internal diameter of the central internal element chamber and the inner diameter of the input exhaust tube are substantially equal. The axial hole, where the input exhaust tube resides, can have a diameter larger than the internal diameter of the central internal element chamber. The transition from the axial hole where the input exhaust tube resides to the central internal element chamber can be by way of a taper.

In accordance with another embodiment of the invention, the improvement can reside in the internal diameter of the central internal element chamber, the inner diameter of the input exhaust tube, and the inner diameter of the exit exhaust tube having a relationship so as to minimize gas turbulence within the central internal element chamber. In accordance with certain features of the invention, the internal diameter of the central internal element chamber, the inner diameter of the input exhaust tube, and the inner diameter of the exit exhaust tube can be substantially equal. The axial hole where the input exhaust tube resides, and the axial hole where the exit exhaust tube resides can each have a diameter larger than the internal diameter of the central internal element chamber. The axial hole where the input exhaust tube resides and the axial hole where the exit exhaust resides can have equal diameters. The transistion from the axial hole where the input exhaust tube resides to the central internal element chamber can be by way of a taper; the transition from the axial hole where the exit exhaust tube resides to the central internal element chamber can be by way of a taper.

BRIEF DESCRIPTION OF THE DRAWINGS

Other objects, and advantages and features of this invention, together with its construction and mode of operation, will become more apparent from the following description, when read in conjunction with the accompanying drawings, in which like reference numerals refer to like components, and in which.

DESCRIPTION OF PREFERRED EMBODIMENTS

Figure 1:
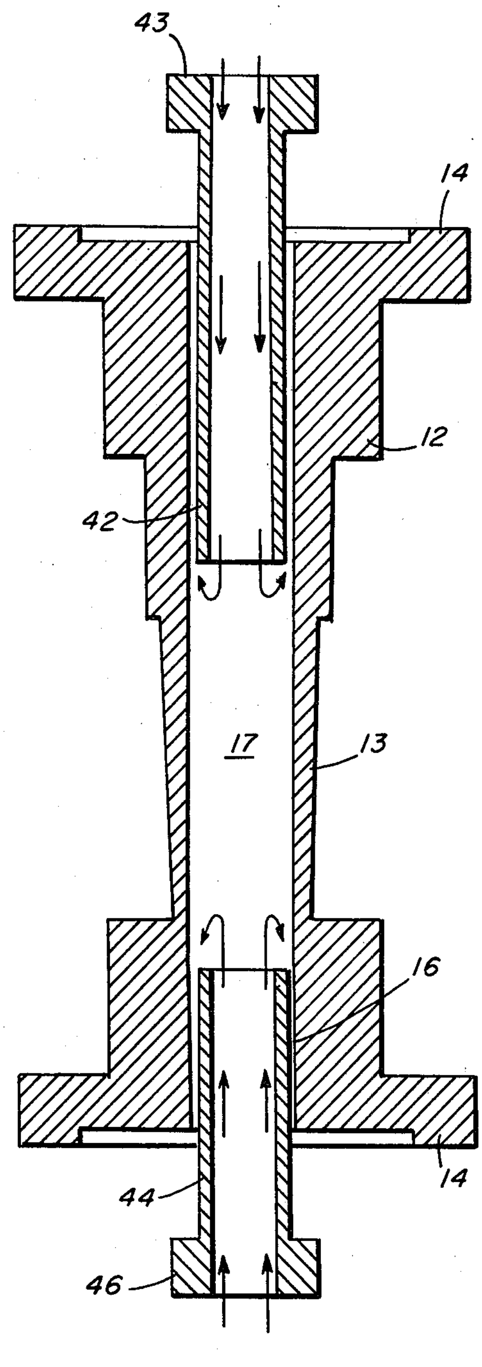
FIG. 1 is a cross-sectional view, taken along its principal axis, of a graphite heating element of the prior art, together with associated input and exit exhaust tubes.

As used in the following description, elements and portions thereof designated by two-digit reference numerals indicate subject matter which does not necessarily form a part of this invention, but may provide background helpful for an understanding thereof. Those elements and portions thereof provided with three-digit reference numerals refer to subject matter forming constituent portions of this invention.

Figure 1B:
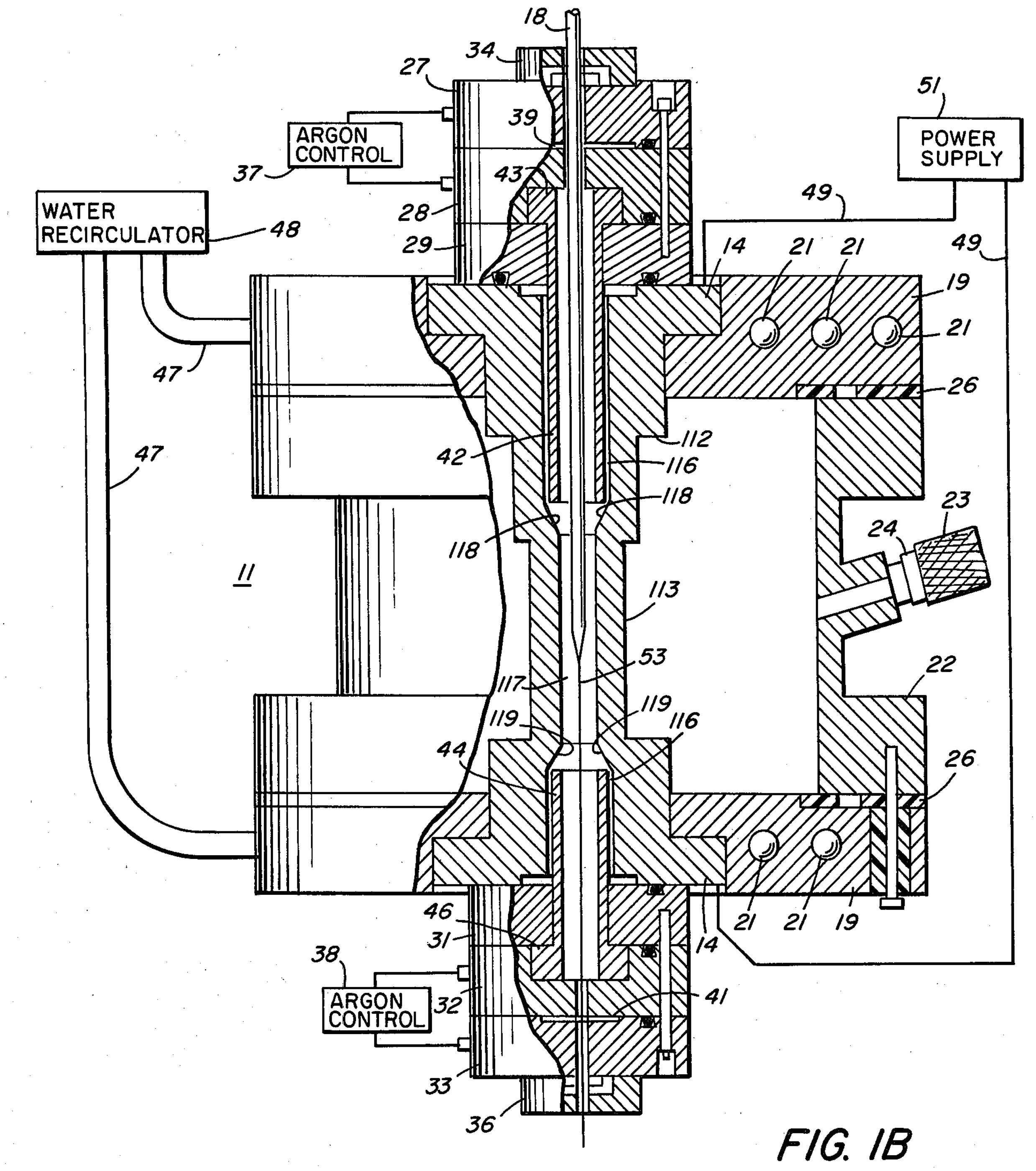
FIG. 1B is a diagram, partly in cross-section, partly schematic, illustrating a graphite heating element, in combination with other components, to form a furnace for drawing optical fiber in accordance with an embodiment of this invention.

Referring to FIG. 1B, there is depicted a furnace 11 for drawing an optical fiber, including a graphite heating element 112 of generally cylindrical shape. The graphite element 112, as depicted in FIG. 1B, has a reduced central cross-sectional configuration 113, and has flanges 14—14 at opposite ends thereof. The graphite element 112 has an axial hole therethrough included enlarged portions 116 at opposite ends thereof. The axial hole further includes a central internal element chamber 117 for receiving a glass preform 18.

For background purposes, though not essential to an understanding of this invention, the furnace 11 further includes a pair of formed contact flanges 19—19 for supporting the graphite heating element 112 at its flanges 14—14 within suitable corresponding recesses therewithin. The contact flanges 19—19 are further formed with ports 21—21 through which cooling water can pass, thereby cooling the flanges 14—14 of the graphite heating element to reduce atmospheric thermal losses. The furnace 11 further includes a circumferential furnace chamber 22 which surrounds, but does not come into physical contact with, the graphite heating element 112. The furnace chamber 22 can include a sight port 23 for visually inspecting the graphite element 112. Attached to the sight port 23 can be a suitable gas port 24 through which argon or other suitable inert gas can be applied. The furnace chamber 22 is coupled to the contact flanges 19—19 by suitable insulating side shields 26—26. The shields 26—26 are electrically insulating, but, desirably, are not thermally insulating. Although not shown, heat insulation can be applied between the graphite heating element 112 and the circumferential furnace chamber 22. A plurality of flanges can be applied to the furnace 11 including a top flange 27, which is coupled to a top gas flange 28, which, in turn, is coupled to a coupling flange 29, the coupling flange 29 being applied to one flange 14 of the graphite element 112. Likewise, at the opposite end of the graphite heating element 112, its flange 14 is attached to a coupling flange 31, which, in turn, is coupled to a bottom gas flange 32, which, in turn, is coupled to a bottom flange 33. The top flange 27 is coupled to an iris part 34. Similarly, the bottom flange 33 is coupled to an iris part 36. The iris part 34 has a variable iris, as well known to those skilled in the art, which can be adjusted so as to provide an annular diameter which is slightly in excess of the diameter of the preform 18 which passes therethrough. In similar fashion, the annular diameter of the iris part 36 can be varied so as to permit the drawn fiber to pass therethrough.

Argon, applied to the fiber drawing furnace 11, is controlled by separate argon controls 37, 38. The argon control 37 controls argon applied between the top flange 27 and the top gas flange 28. In similar fashion, the argon control 38 controls the argon which is applied between the bottom gas flange 32 and the bottom flange 33. A concentric recess within the top flange 27 acts as a top gas curtain 39. The bottom gas curtain 41 is applied as a concentric recess within the bottom flange 33.

An input exhaust tube 42 is fitted with its central portion within the annular axial hole at the enlarged portion 116 at the top of the graphite heating element 112. The input tube 42 has a flange 43 which is engaged within a suitable recess in the top gas flange 28 and is held in place by the top coupling flange 29. In similar fashion, an exit exhaust tube 44 is fitted with its central portion within the annular axial hole at the enlarged portion 116 at the bottom of the graphite element 112. The tube 44 has a flange 46 which is supported by the bottom gas flange 32 and the bottom coupling flange 31. In typical operation, argon (controlled by the argon control 37) passes from the top gas flange 28, through the input exhaust tube 42, upward along the exterior portion of the input exhaust tube 42, and out through the top of the graphite heating element 112. In similar fashion, argon (controlled by the argon control 38) passes upward through the central orifice of the exit exhaust tube 44, into the central internal element chamber 117, downward along the exterior portion of the exhaust tube 44, and out through the bottom of the graphite heating element 112.

Recirculating water can be applied through the orifices 21—21 of the contact flanges 19—19 through recirculating pipes 47—47 by means of a water recirculator 48. Electricity can be applied along suitable conduits 49—49 to the flanges 14—14 of the graphite heating element 112. A d.c. electric voltage (for example, 6 volts) is applied across the flanges 14—14 of the conductive graphite element 112. The large resulting current through the reduced central cross-sectional configuration 113 of the graphite element 112 provides a large electric power ($P=I^2R$) to resistively heat the cross-sectional configuration 113, and, hence, the central internal element chamber 117, so that an optical fiber 53 can be drawn from the preform 18.

Figure 2:
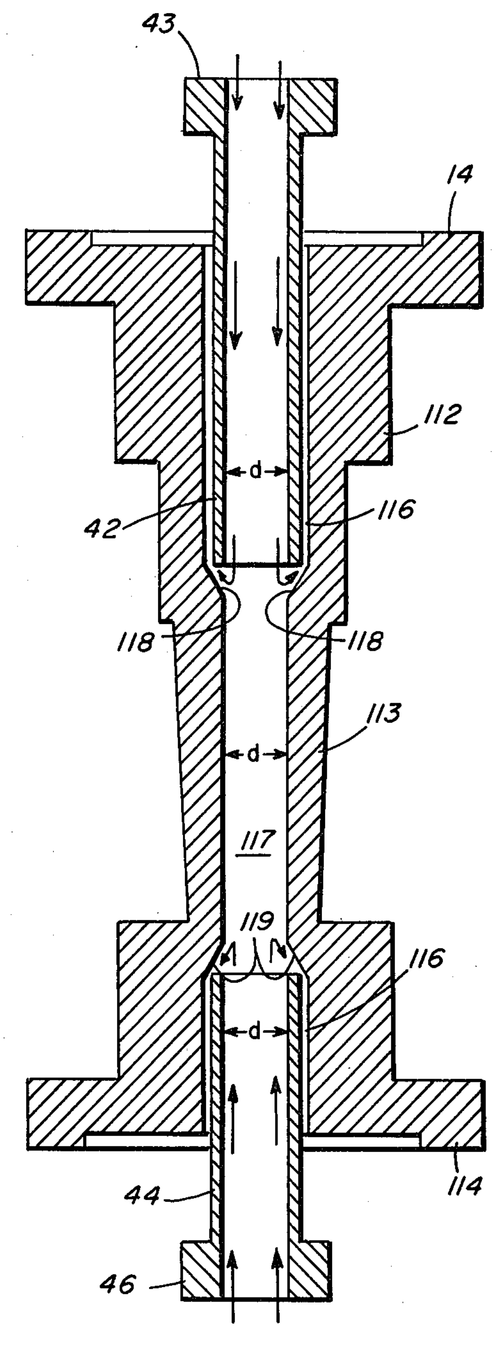
FIG. 2 is a cross-sectional view taken along its principal axis of a graphite heating element, in accordance with a preferred embodiment of this invention, together with associated input and exit exhaust tubes.

The improved graphite heating element 112, in accordance with this invention, is best shown in the cross-sectional view, along its principal axis, in FIG. 2. FIG. 2, in addition to showing the graphite heating element 112 in accordance with the preferred embodiment of the invention, also shows the input exhaust tube 42 and the exit exhaust tube 44. The input exhaust tube 42 and the exit exhaust tube 44, in accordance with a best mode contemplated by the inventor, have like internal diameters d. In accordance with the invention, the graphite heating element 112 has an axial hole therethrough including enlarged portions 116 at opposite ends thereof so as to accommodate the input exhaust tube 42 and the exit exhaust tube 44 therewithin, while permitting sufficient space between the tubes and the graphite heating element so that argon flow can pass thereby. The graphite heating element 112 has a reduced central cross-sectional configuration 113 so as to provide a central internal element chamber 117 having an interior diameter d equal to the internal diameters of the input exhaust tube 42 and the exit exhaust tube 44. In lieu of providing identical diameters for the input exhaust tube 42, the output exhaust tube 44, and the central internal element chamber 117, the dimensions can be such that they minimize gas turbulence within the chamber 117. Such dimensions may vary depending upon factors such as the temperature of operation and the relative sizes of the components. In accordance with one preferred mode contemplated by the inventor, the transitions from the enlarged holes 116 to the central internal element chamber 117 can take place by way of tapers 118 and 119. However, an alternative design, such as a step, can be used.

Where the input exhaust tube 42 and the output exhaust tube 44 terminate within the graphite heating element 112, tapers 118, 119 are provided to assure that the internal diameter of the element chamber 117 is the same size d as the diameter d of the holes of the exhaust tubes 42,44. By so doing, the exhaust tubes 42, 44 and the element 112 can be sized to the preform, thereby decreasing the annular space between the element chamber 117 and the preform. The flow of argon (or other suitable inert gas) is similar to those in prior devices, except that gas turbulence is significantly reduced.

Other modifications can be preformed without departing from the spirit and scope of this invention. For example, instead of a taper or a step, a gradual curve can be used to provide the transition between the enlarged holes and the narrower central internal element chamber. In lieu of graphite, other appropriate material can be used for the heating element.

What is claimed is:

1. A furnace for drawing optical fiber, including a graphite heating element of generally cylindrical shape with a reduced central cross-sectional configuration having a flange at opposite ends thereof and having an axial hole therethrough including a central internal element chamber for receiving a glass preform, means for heating said reduced central cross-sectional configuration and, hence, said central internal element chamber so that an optical fiber can be drawn from said preform, means for supporting said graphite element at said flanges;

an input exhaust tube having a principal central portion adapted to reside within said axial hole at the top of said graphite heating element, having an inner diameter large enough to permit said glass preform to fit therewithin and to permit an inert gas to pass exterior to said preform and interior to said tube, and having a flange;

means for supporting said input exhaust tube;

an exit exhaust tube having a principal central portion adapted to reside within said axial hole at the bottom of said graphite heating element, having an inner diameter large enough to permit an optical fiber to pass therethrough and to permit an inert gas to pass exterior to said optical fiber and interior to said exit exhaust tube, and having a flange;

means for supporting said exit exhaust tube; and means for applying an inert gas to the top of said heating element so that inert gas passes down through the interior of said input exhaust tube and up and out around the outside of said input tube within said axial hole, and means for applying an inert gas to the bottom of said heating element so that inert gas passes up through the interior of said exit exhaust tube and is permitted to pass down and out around the outside of said exit exhaust tube within said axial hole;

wherein the improvement comprises an internal diameter of said central internal element chamber and said inner diameter of said input exhaust tube have a relationship so as to minimize gas turbulence within said central internal element chamber.

2. The improvement as recited in claim 1 wherein said internal diameter of said central internal element chamber and said inner diameter of said input exhaust tube are substantially equal.

3. The improvement as recited in claim 2 in which said axial hole, where said input exhaust tube resides, has a diameter larger than said internal diameter of said central internal element chamber.

4. The improvement as recited in claim 3 in which the transition from said axial hole where said input exhaust tube resides to said central internal element chamber is via a taper.

5. A furnace for drawing optical fiber, including a graphite heating element of generally cylindrical shape with a reduced central cross-sectional configuration having a flange at opposite ends thereof and having an axial hole therethrough including a central internal element chamber for receiving a glass preform, means for heating said reduced central cross-sectional configuration and, hence, said central internal element chamber so that an optical fiber can be drawn from said preform, means for supporting said graphite element at said flanges;

an input exhaust tube having a principal central portion adapted to reside within said axial hole at the top of said graphite heating element, having an inner diameter large enough to permit said glass preform to fit therewithin and to permit an inert gas to pass exterior to said preform and interior to said tube, and having a flange;

means for supporting said input exhaust tube;

an exit exhaust tube having a principal central portion adapted to reside within said axial hole at the bottom of said graphite heating element, having an inner diameter large enough to permit an optical fiber to pass therethrough and to permit an inert gas to pass exterior to said optical fiber and interior to said exit exhaust tube, and having a flange;

means for supporting said exit exhaust tube; and means for applying an inert gas to the top of said heating element so that inert gas passes down through the interior of said input exhaust tube and up and out around the outside of said input tube within said axial hole, and means for applying an inert gas to the bottom of said heating element so that inert gas passes up through the interior of said exit exhaust tube and is permitted to pass down and out around the outside of said exit exhaust tube within said axial hole;

wherein the improvement comprises an internal diameter of said central internal element chamber, said inner diameter of said input exhaust tube, and said inner diameter of said exit exhaust tube have a relationship so as to minimize gas turbulence within said central internal element chamber.

6. The improvement as recited in claim 5 wherein said internal diameter of said central internal element chamber, said inner diameter of said input exhaust tube, and said inner diameter of said exit exhaust tube are substantially equal.

7. The improvement as recited in claim 6 in which said axial hole where said input exhaust tube resides, and said axial hole where said exit exhaust tube resides, have diameters larger than said internal diameter of said central internal element chamber.

8. The improvement as recited in claim 7 in which said axial hole where said input exhaust tube resides and said axial hole where said exit exhaust tube resides have equal diameters.

9. The improvement as recited in claim 8 in which the transition from said axial hole, where said input exhaust tube resides, to said central internal element chamber is via a taper, and in which the transition from said axial hole, where said exit exhaust tube resides, to said central internal element chamber is via a taper.

* * * * *